(12) United States Patent
Rusch

(10) Patent No.: US 7,731,063 B2
(45) Date of Patent: Jun. 8, 2010

(54) DRY PRODUCT DISPENSER WITH PORTION CONTROL

(75) Inventor: Gerald A. Rusch, Fond du Lac, WI (US)

(73) Assignee: Server Products, Inc., Richfield, WI (US)

( * ) Notice: Subject to any disclaimer, the term of this patent is extended or adjusted under 35 U.S.C. 154(b) by 444 days.

(21) Appl. No.: 11/671,121

(22) Filed: Feb. 5, 2007

(65) Prior Publication Data

US 2007/0181604 A1   Aug. 9, 2007

Related U.S. Application Data

(60) Provisional application No. 60/765,517, filed on Feb. 6, 2006.

(51) Int. Cl.
B65D 88/54 (2006.01)

(52) U.S. Cl. .................................. 222/306; 222/363

(58) Field of Classification Search ............. 222/306, 222/218, 305, 307, 308, 363
See application file for complete search history.

(56) References Cited

U.S. PATENT DOCUMENTS

| | | | |
|---|---|---|---|
| 852,603 A | 5/1907 | Hanlon | |
| 1,022,774 A | 4/1912 | De Julio | |
| 2,259,710 A * | 10/1941 | Stern | 222/41 |
| 2,475,381 A | 7/1949 | Erickson | |
| 2,575,967 A | 11/1951 | May | |
| 2,584,726 A * | 2/1952 | Mcomber | 222/306 |
| 2,692,068 A * | 10/1954 | Worswick | 222/276 |
| 2,698,121 A * | 12/1954 | Van Steyn | 141/72 |
| 2,778,528 A * | 1/1957 | Corcoran | 222/46 |
| 2,820,577 A * | 1/1958 | Winters et al. | 222/306 |
| 2,858,859 A * | 11/1958 | Mohr et al. | 141/82 |
| 2,920,796 A | 1/1960 | Field | |
| 2,933,763 A * | 4/1960 | Alesi | 425/182 |
| 3,033,164 A | 5/1962 | Evers | |
| 3,090,524 A * | 5/1963 | Corcoran | 222/46 |
| 3,091,368 A * | 5/1963 | Harley et al. | 222/56 |
| 3,169,675 A | 2/1965 | Gutzmann et al. | |
| 3,204,833 A | 9/1965 | Weitzner | |
| 4,009,788 A * | 3/1977 | Waldhofer | 414/187 |
| 4,053,087 A | 10/1977 | Lack et al. | |
| 4,058,238 A | 11/1977 | Eckman | |
| 4,074,832 A | 2/1978 | McCarthy | |
| 4,151,933 A * | 5/1979 | Myers | 222/288 |
| 4,162,751 A * | 7/1979 | Hetland et al. | 222/293 |

(Continued)

Primary Examiner—Kevin P Shaver
Assistant Examiner—Donnell Long
(74) Attorney, Agent, or Firm—Andrus, Sceales, Starke & Sawall, LLP

(57) ABSTRACT

A dispenser for use in dispensing a selected volume of a granulated, dry product. The dispenser includes a main body having an open interior that receives the supply of granulated products to be dispensed. A loading and dispensing member is positioned to receive the granulated product within a receiving cavity formed as part of the loading and dispensing member. A portion control member is selectively positioned within the receiving cavity. The position of the portion control member can be adjusted to vary the portion volume received within the receiving cavity between the portion control member and an open end of the receiving cavity. Once the portion volume has been received within the receiving cavity, the loading and dispensing member is moved to the dispensing position to dispense the portion volume. In this manner, a known, selected portion volume can be dispensed from the dispenser.

14 Claims, 8 Drawing Sheets

U.S. PATENT DOCUMENTS

| | | | |
|---|---|---|---|
| 4,503,995 A * | 3/1985 | Anderson | 222/219 |
| 4,511,067 A | 4/1985 | Martin et al. | |
| 4,634,026 A * | 1/1987 | Suay Puig et al. | 222/218 |
| 4,957,219 A | 9/1990 | Robbins et al. | |
| 5,052,288 A | 10/1991 | Marquez et al. | |
| 5,222,635 A * | 6/1993 | Chamo | 222/306 |
| 5,292,037 A | 3/1994 | Held | |
| 5,303,672 A | 4/1994 | Morris | |
| 5,375,744 A * | 12/1994 | Henderson | 222/306 |
| 5,927,558 A | 7/1999 | Bruce | |
| 5,947,336 A | 9/1999 | Thompson | |
| 6,029,828 A | 2/2000 | Robbins et al. | |
| 6,357,345 B1 | 3/2002 | Cusenza et al. | |
| D469,661 S | 2/2003 | Rivkin | |
| D470,016 S | 2/2003 | Rivkin | |
| D471,407 S | 3/2003 | Rivkin | |
| 6,581,511 B2 | 6/2003 | Cusenza et al. | |
| 6,964,355 B2 | 11/2005 | Landau | |
| 2002/0112613 A1 | 8/2002 | Cusenza et al. | |
| 2003/0234264 A1 | 12/2003 | Landau | |

* cited by examiner

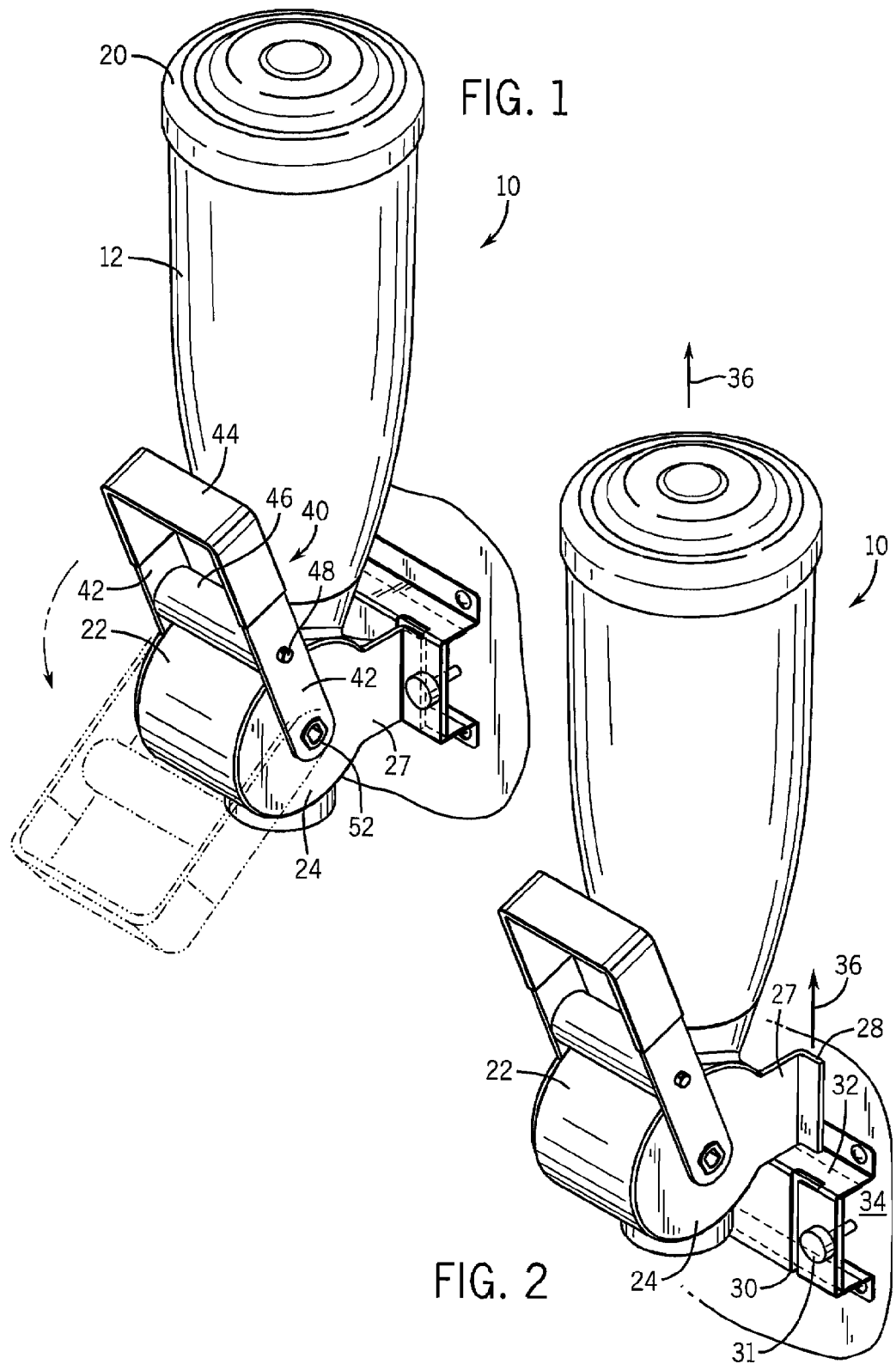

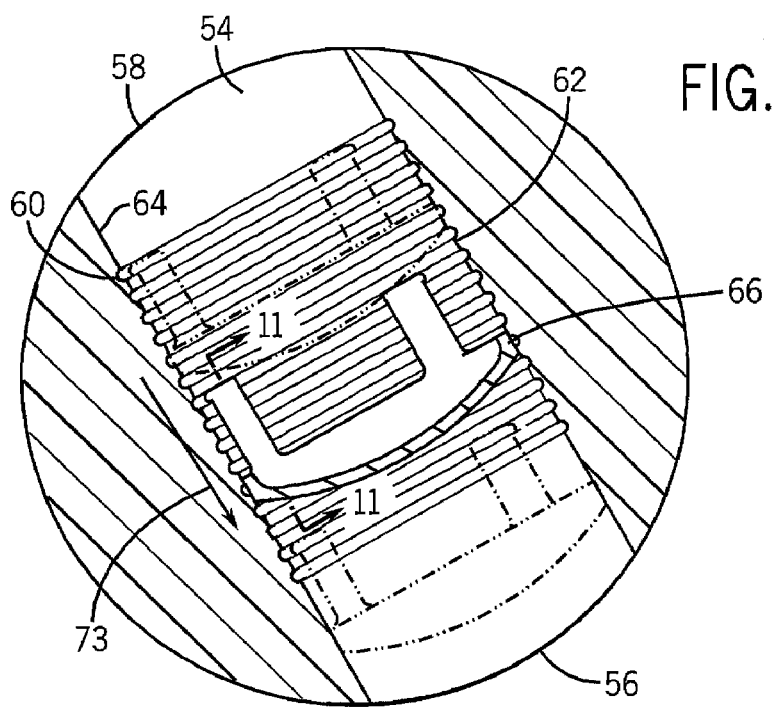
FIG. 9
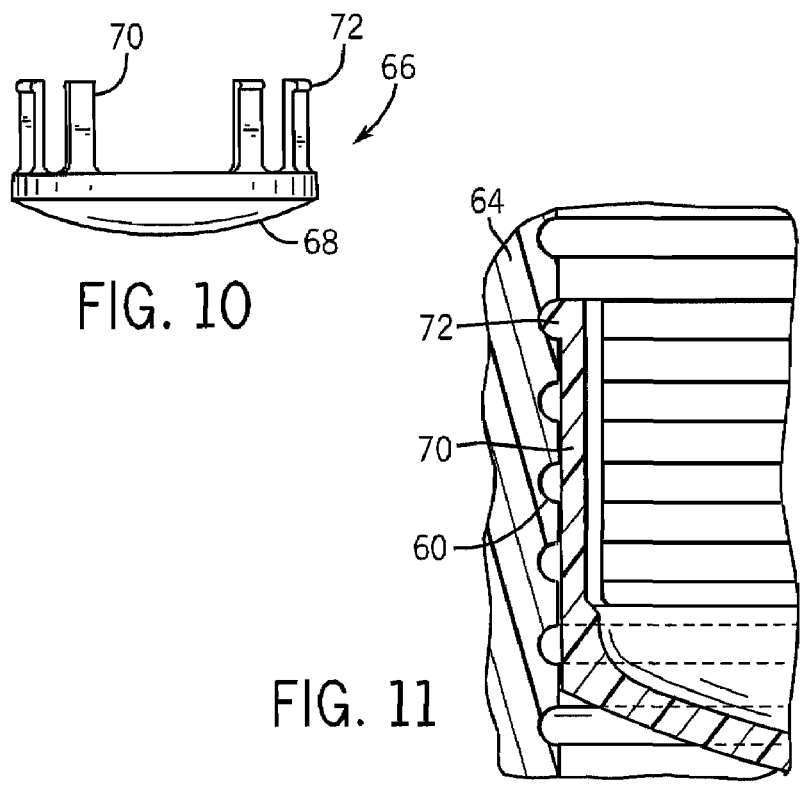
FIG. 10
FIG. 11

DRY PRODUCT DISPENSER WITH PORTION CONTROL

CROSS REFERENCE TO RELATED APPLICATION(S)

The present application is based on and claims priority to U.S. Provisional Patent Application No. 60/765,517, filed Feb. 6, 2006.

BACKGROUND OF THE INVENTION

The present invention relates to a device for dispensing dry, granulated products or powders. More specifically, the present invention relates to a product dispenser that dispenses a user-selectable, measured portion of the granulated product.

In many restaurants and food establishments, many frozen food menu items, such as shakes, smoothies and blended ice cream drinks are made with different types of granulated dry products, such as chocolate candies, candy bar pieces and other small, granulated products. It is desirable to use the same amount of the granulated product in the creation of the menu item.

Not only is there a need to dispense a known volume of the granulated product, it is also desirable to allow the adjustability of the amount of product dispensed based upon the requirement of the restaurant or food service facility where the dispenser is located.

SUMMARY OF THE INVENTION

A dispenser for dispensing a selected volume of a granulated product as shown and described in the present disclosure. The dispenser includes a main body that has an open interior that receives a supply of the granulated product. The main body preferably includes an open loading end to receive the supply of the granulated product and a discharge opening to direct the granulated product out of the main body.

A lower portion is integrally formed with the main body and has a generally arcuate outer wall such that the loading portion receives a loading and dispensing member. Preferably, the loading and dispensing member is a cylindrical component having a receiving cavity that extends from a first end to a second end. When the loading and dispensing member is in the loading position, the first end of the receiving cavity is aligned with the discharge opening of the main body to receive the granulated product. When the loading and dispensing member is in the dispensing position, the first end of the receiving cavity is generally aligned with a discharge spout of the lower section to dispense the granulated product.

A portion control member is selectively positioned within the receiving cavity to define a portion volume between the portion control member and the first end of the receiving cavity. In one embodiment, the inner wall that forms the receiving cavity includes a plurality of spaced receiving grooves. The plurality of receiving grooves are each sized to receive the portion control member such that the portion control member is selectively movable between a plurality of distinct positions. The position of the portion control member within the receiving cavity determines the portion volume, which is defined by the volume between the portion control member and the first end of the receiving cavity. Thus, the location of the portion control member within the receiving cavity determines the volume of granulated product received and dispensed by the loading and dispensing member.

In one embodiment, the loading and dispensing member includes a series of volume markings that display the portion volume of the portion cavity when the portion control member is aligned with the individual volume marking. Thus, by selectively moving the portion control member to be in alignment with one of the series of volume markings, the user can determine the portion volume being dispensed.

The dispenser further includes a handle mounted to each side of the loading and dispensing member such that the handle can be operated to move the loading and dispensing member between the loading position and the dispensing position. Preferably, the handle includes a spacer that contacts the outer surface of the lower portion to help guide the handle in moving the loading and dispensing member between the loading position and the dispensing position.

The dispenser includes a pair of attachment flanges that are each received within a mounting bracket mounted to a wall of the building or location where the dispenser is being used. Preferably, the mounting bracket includes a pair of slots that receive the attachment flanges. Once the attachment flanges are received within the slots of the mounting bracket, a pressure plate is brought into contact with the attachment flanges to secure the dispenser in its desired position. Once the dispenser has been emptied, the pressure plate is released and the entire dispenser can be removed from the mounting bracket and refilled.

BRIEF DESCRIPTION OF THE DRAWINGS

The drawings illustrate the best mode presently contemplated of carrying out the invention. In the drawings:

FIG. 1 is a perspective view of the product dispenser of the present invention that is mounted to a stationary mounting bracket;

FIG. 2 is a perspective view illustrating the removal of the product dispenser from the mounting bracket;

FIG. 9 is a magnified view of the portion control member within the receiving cavity;

FIG. 10 is a front view of the portion control member;

FIG. 11 is a section view taken along line 11-11 of FIG. 9 showing the interaction between the portion control member and the wall of the receiving cavity.

DETAILED DESCRIPTION OF THE INVENTION

Figure 6:
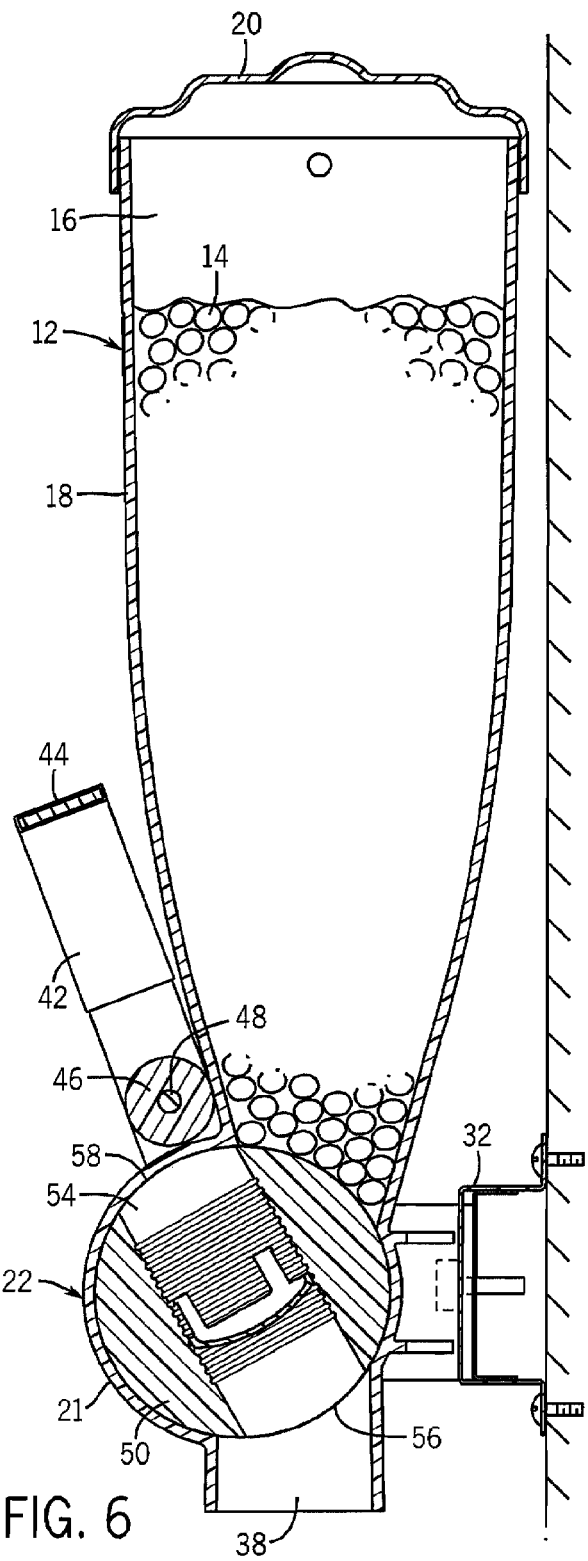
FIG. 6 is a section view taken along line 6-6 of FIG. 5.

FIG. 1 illustrates a dry product dispenser 10 constructed in accordance with the present disclosure. The dispenser 10 includes a main body 12 for storing a supply of granular products 14 within a hollow, open interior 16 defined by an outer wall 18 of the body 12, as shown in FIG. 6. Referring back to FIG. 1, the body 12 includes a lid 20 mounted to the top of the body 12 to enclose the supply of granular products contained therein. The lid 20 forms a tight fit with the upper end of the body to limit the moisture within the open interior 16 to enhance the freshness of the granular products 14. As an example, the dry, granular products can be small candies, crushed candy bars, sugars, artificial flavors or any other type of granular product that needs to be dispensed. In the embodiment of the invention illustrated, the body 12 has an internal volume of approximately two liters for holding the granular products to be dispensed. Preferably, the entire body 12 is formed from a molded plastic material, although other materials that can be sanitized are contemplated as being within the scope of the present invention.

Figure 4:
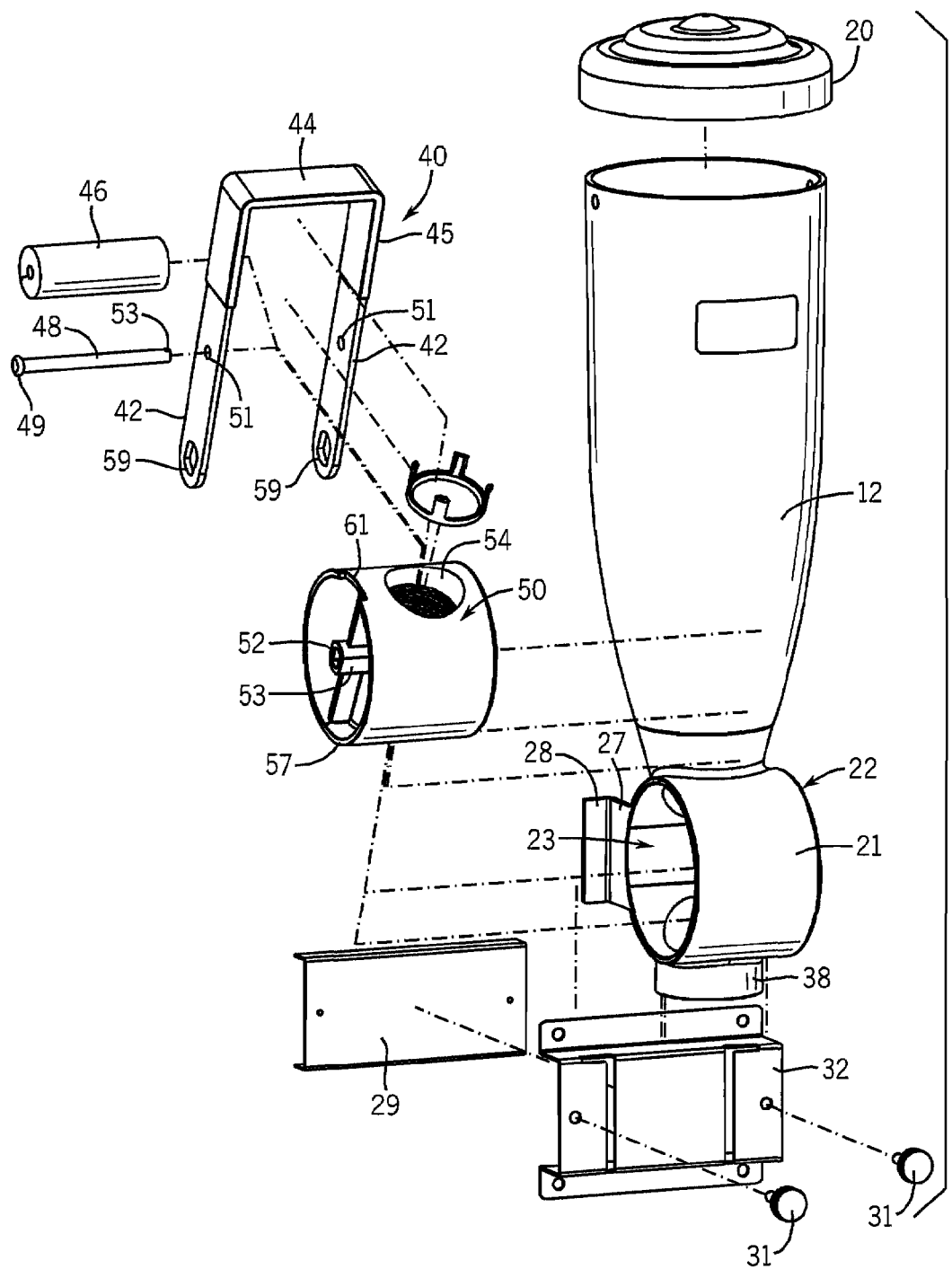
FIG. 4 is an exploded view of the product dispenser.

As illustrated in FIG. 4, the body 12 includes a lower section 22 that has an arcuate outer surface 21 that defines a generally cylindrical internal cavity 23. As can be seen in FIG. 2, one end of the internal cavity defined by the lower section 22 includes a solid side wall 24, while the opposite side of the internal cavity 23 is open, as best illustrated in FIG. 4. As illustrated in FIG. 2, the side wall 24 includes an extending section 27 having an attachment flange 28 extending perpendicular to the extending section 27. As shown in FIG. 4, the opposite side of the lower section 22 also includes an extending section 27 including a similar attachment flange 28. In the embodiment of the invention illustrated in FIGS. 2 and 4, the body 12, lower section 22, extending sections 27 and attachment flanges 28 are integrally molded to form a unitary structure.

The attachment flanges 28 formed on each side of the lower section 22 are designed to be received within a mounting slot 30 formed in a mounting bracket 32 securely mounted to the wall 34. As shown in FIG. 4, a pressure plate 29 is pulled into contact with the bracket 32 by a pair of thumb screws 31. As illustrated in FIG. 2, the entire dry product dispenser 10 can be removed from the mounting bracket 32 by first loosening the thumb screws 31 and lifting the dry product dispenser 10 in the direction illustrated by arrows 36.

As best shown in FIG. 6, the lower section 22 is integrally formed with a discharge spout 38 that directs the discharged granular products in a controlled manner. The body 12, lower section 22 and discharge spout 38 are formed as an integral member, preferably of a molded plastic material that can be easily sanitized.

Referring back to FIG. 4, the dry product dispenser 10 includes a one-piece actuation handle 40 having a pair of spaced side arms 42 and a cross piece 44 to define the generally U-shaped handle 40. The top end of the handle 40, including the cross piece 44, is covered with a vinyl coating 45 to enhance the grip of the handle by the user. Preferably, the entire handle 40 is formed from a unitary metallic member.

As illustrated in FIG. 1, the handle 40 is movable from an upper, dispensing position to a lower, loading position, which is shown in phantom. The handle 40 includes a spacer 46 that is rotatably mounted between the pair of side arms 42 by a pin 48. As shown in FIG. 4, the pin 48 extends through a pair of holes 51 formed in each of the side arms 42 and is retained by an expanded head 49 and detent 53. As shown in FIG. 6, the outer circumferential surface of the spacer 46 contacts the curved outer surface 21 of the lower section 22 to aid in supporting movement of the handle 40 between the loading and dispensing positions.

Referring now to FIG. 4, a loading and dispensing member 50 is received within the internal cavity 23 defined by the lower section 22. The member 50 is cylindrical in the illustrated embodiment and is positioned within the internal cavity 23 by passing the cylindrical member 50 through the open end of the lower section 22.

Figure 3:
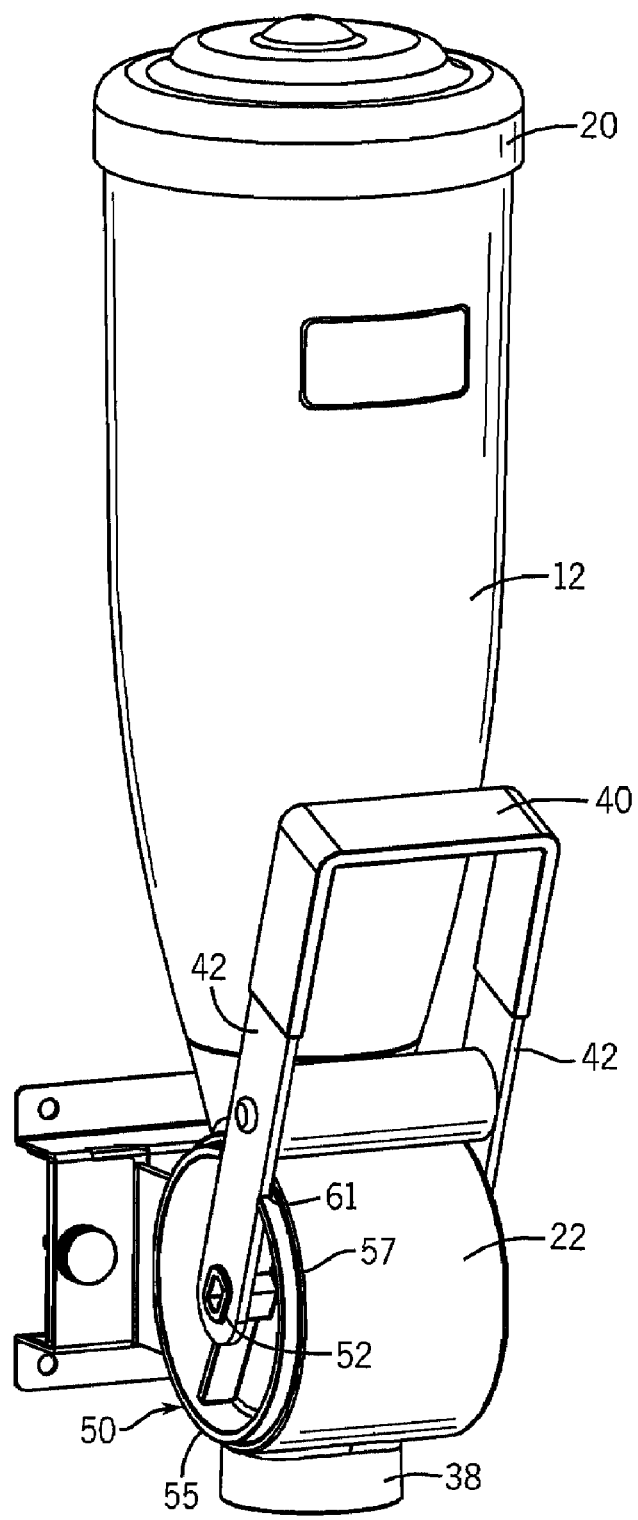
FIG. 3 is a perspective view of the dispenser illustrating the loading and dispensing member.

As shown in FIG. 1, when the cylindrical member 50 is received within the internal cavity 23, an engagement tab 52 formed as an extended portion of the center shaft 53 extends through an opening formed in the side wall 24. As illustrated in FIG. 4, the opposite side of the member 50 also includes an oblong engagement tab 52 that extends from the center shaft 53. As illustrated in FIG. 3, when the member 50 is received within the lower section 22, an outer edge surface 55 of the member 50 extends past the outer edge 57 of the lower section 22.

When the cylindrical member 50 is positioned within the lower section 22, the pair of engagement tabs 52 are each received within a lower opening 59 formed in each of the pair of side arms 42. The side arm 42 positioned adjacent the open end of the lower section 22 is received within a recessed notch 61 formed in the outer edge 57 of the member 50, as illustrated in FIGS. 3 and 4. The engagement between the side arm 42 and the engagement notch 61 allows the handle 40 to better control the movement of the member 50 within the lower section 22. The handle 40 can be removed from engagement with the member 50 by flexing the pair of side arms 42 outward to remove the engagement tabs 52 from the pair of lower openings 59.

Referring again to FIGS. 4 and 6, the member 50 includes a cylindrical receiving cavity 54 that is open from a first end 56 to a second end 58. Although the receiving cavity 54 is shown in the preferred embodiment as being cylindrical, it is contemplated that the receiving cavity 54 could have various different shapes.

Referring now to FIG. 9, the receiving cavity 54 includes a series of ring-shaped grooves 60 contained within an adjustment section 62 of the receiving cavity. In the preferred embodiment of the invention, the grooves 60 are recessed from the inner walls 64 and are spaced from each other an equal distance.

As illustrated in FIG. 9, the receiving cavity 54 is sized to receive a portion control device 66 that extends across the entire receiving cavity 54 to interrupt the cavity from the first end 56 to the second end 58. As can best be seen in FIG. 10, the portion control device 66 includes a dome-shaped top wall 68 and a series of retaining legs 70 each having a protruding foot 72. As can best be seen in FIG. 11, the protruding foot 72 of each retaining leg 70 is sized to be received within the series of grooves 60 formed in the inner wall 64 of the cylinder 50. As can be understood in FIG. 9, the position of the portion control device 66 can be adjusted relative to the first end 56 such that the volume of the receiving cavity 54 between the first end 56 and the portion control device 66, referred to as the portion volume, can be varied by adjusting the position of the portion control device 66 within the adjustment section 62 in the direction shown by arrow 73.

Figure 12:
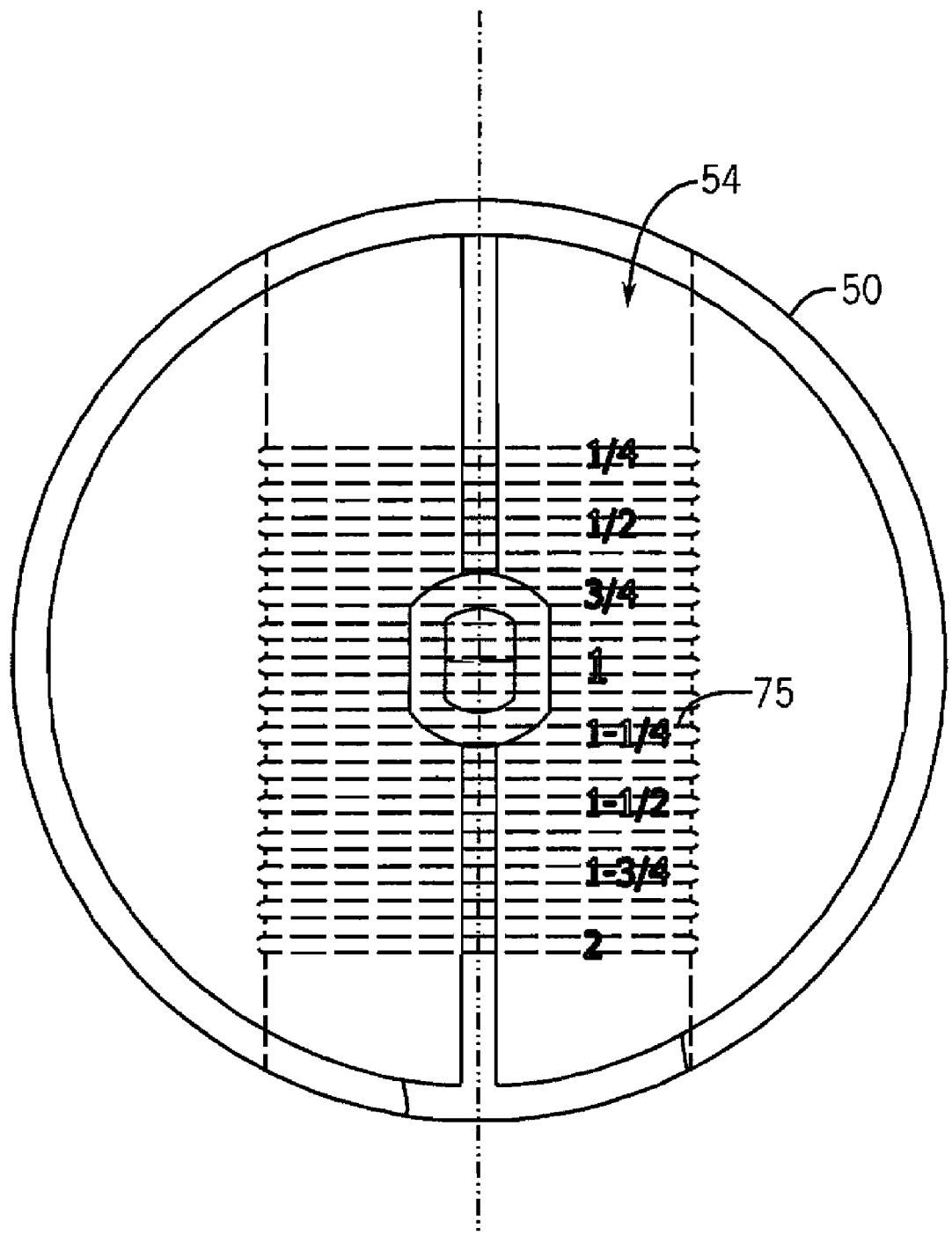
FIG. 12 is a side view of the dispensing cylinder illustrating markings for the variable volume of product to be dispensed.

Referring now to FIG. 12, in the preferred embodiment of the invention, the receiving cavity 54 includes a series of volume markings 75 that are visible from the side of the member 50 and specify the portion volume of the receiving cavity 54 when the portion control device is set in different positions. In the embodiment illustrated in FIG. 12, the portion volumes are marked in ¼ ounce increments such that the volume of the receiving cavity can be set between ¼ ounce and 2 ounces, depending on the user requirements.

Figure 7:
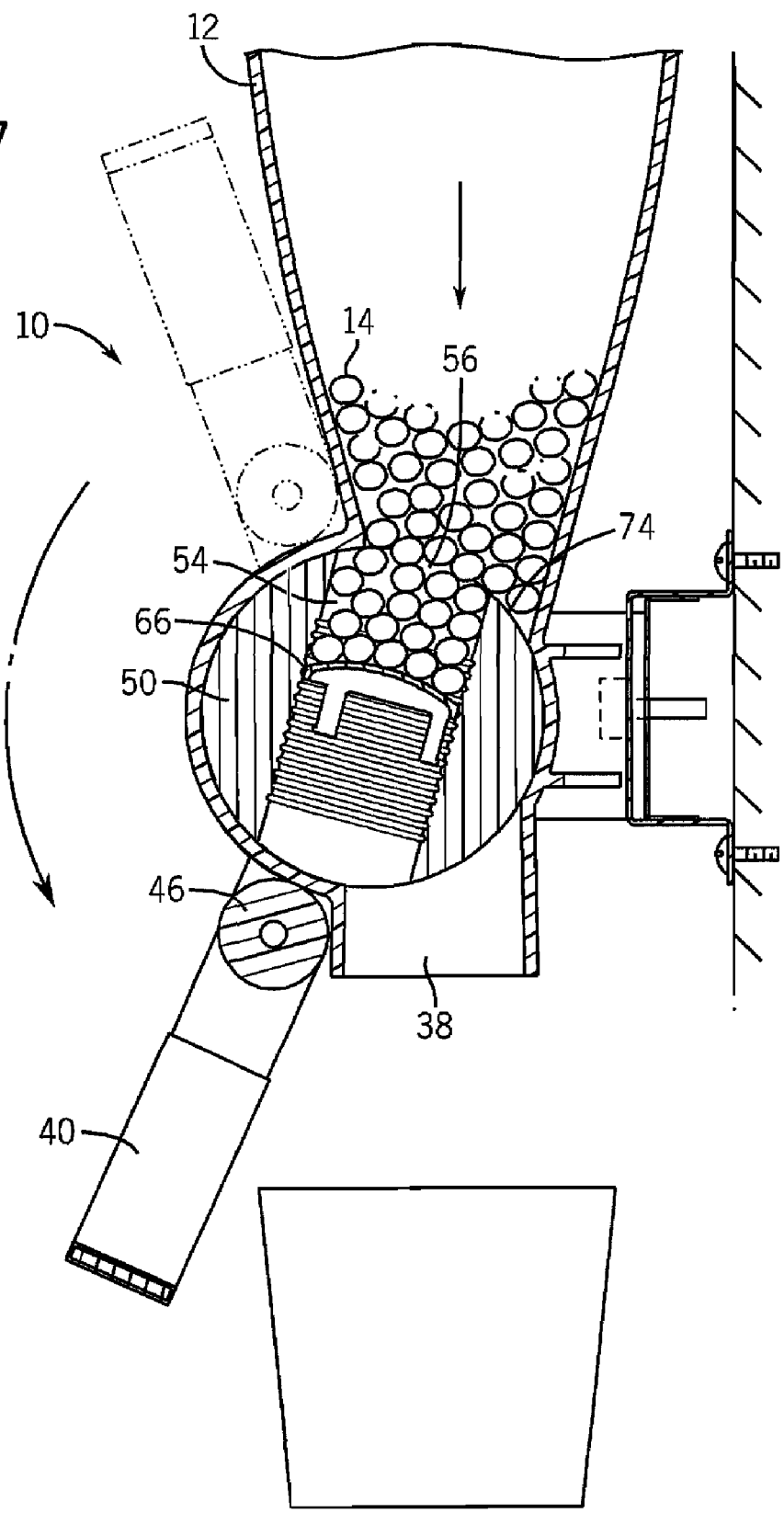
FIG. 7 is a partial section view illustrating the movement of the dispensing handle from the dispensing position to the loading position.

The operation of the dry product dispenser 10 will now be described with initial reference to FIG. 7. Initially, the handle 40 is rotated downward to the loading position, as illustrated in FIG. 7. When the handle 40 is in the loading position, the first end 56 of the loading and dispensing member 50 is aligned with the discharge opening 74 defined at the lower end of the body 12 as the handle 40 moves to the loading position. As the handle 40 is moved downward, the contact between the spacer 46 and the outer wall of the discharge spout 38 vibrates the entire body to jostle the products 14, which aids in loading the receiving cavity.

When the first end 56 of the receiving cavity 54 of the member 50 is aligned with the discharge opening 74, the granular products 14 enter into the receiving cavity 54 until the products fill the volume of the receiving cavity above the portion control device 66. As can be understood in FIG. 7, the volume of products contained within the member 50 is defined by the position of the portion control device 66 within the receiving cavity 54. Since the portion control device 66 is securely held in place by the interaction between the foot 72 contained on each of the retaining legs 70 and one of the grooves 60, the position of the portion control device 66 can be easily adjusted by a user. As discussed, the volume markings 75 molded into the cylinder aid in selecting the volume of the receiving cavity.

Figure 8:
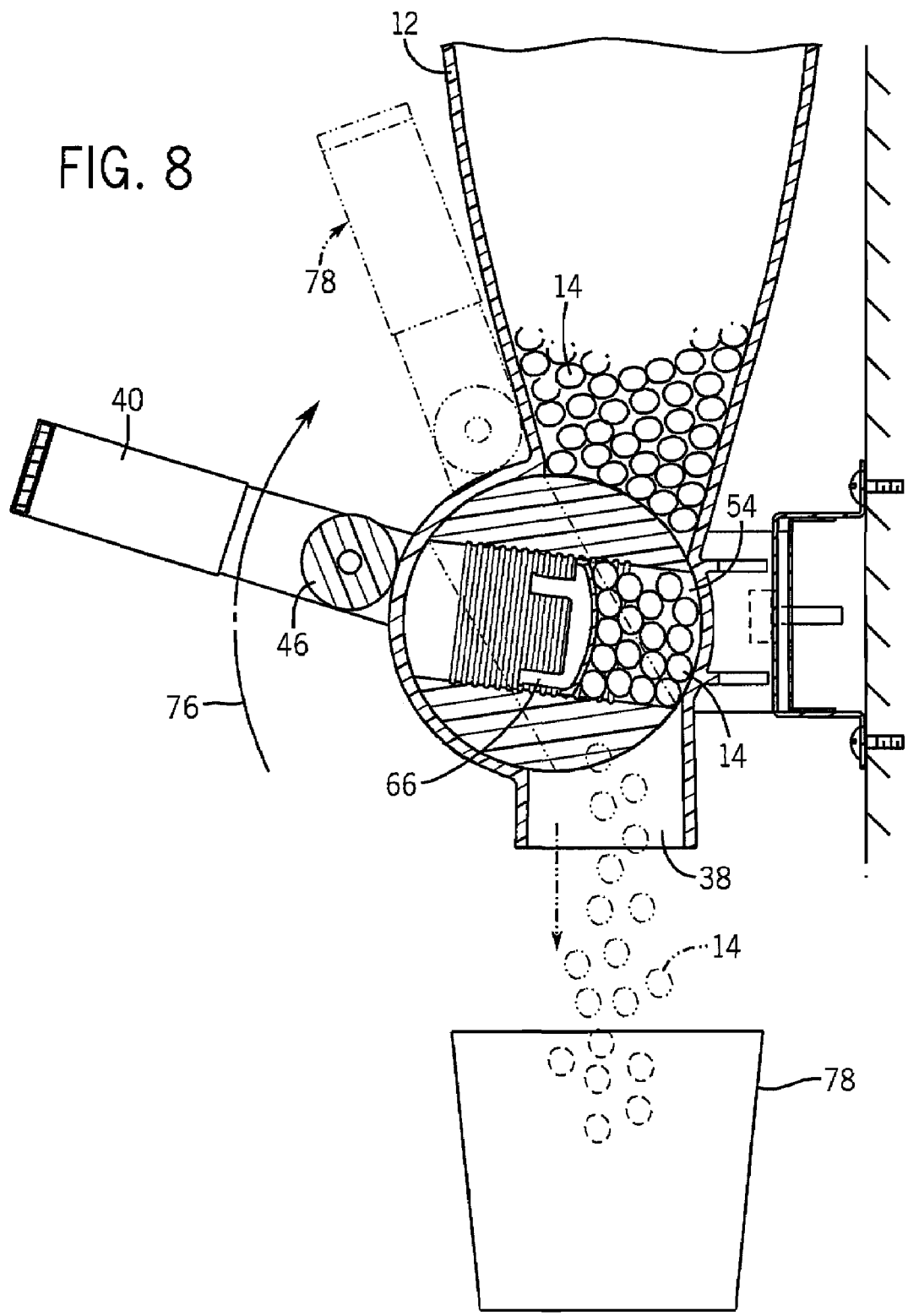
FIG. 8 is a section view similar to FIG. 7 showing the movement of the dispensing handle from the loading position toward the dispensing position.

Referring now to FIG. 8, once the section of the receiving cavity 54 between the first end and the portion control device 66 has been filled with the products 14, the handle 40 can be moved upward, as shown by arrow 76, toward the dispensing position 78. As the handle is moved upward, the open first end of the receiving cavity 54 becomes aligned with the open discharge spout 38, thus allowing the granulated products 14 to be dispensed through the discharge spout 38 and into a container 78. As the handle 40 moves upward, the spacer 46 contacts the outer wall of the body 12, causing the products 14 within the cylindrical member to be jostled, thereby aiding in the discharge of the products.

After the granular products have been dispensed from within the receiving cavity 54, the handle 40 can again be rotated to the lower, loading position shown in FIG. 7 to load the next volume of granular products 14 for dispensing.

Figure 5:
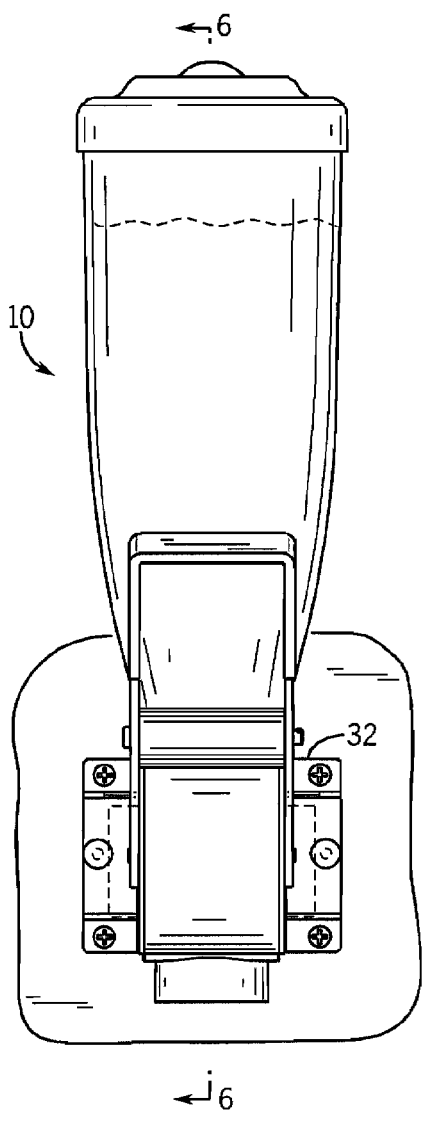
FIG. 5 is a front view of the product dispenser.

Referring now to FIG. 5, the mounting bracket 32 is shown as having a width only slightly greater than the width of the dry product dispenser 10. However, it is contemplated that the mounting bracket 32 could have a length substantially greater than the dry product dispenser 10 such that the single extended mounting bracket could support multiple product dispensers 10 positioned next to each other. In such an embodiment, each of the product dispensers could be filled with a different product to be dispensed.

In the preferred embodiment of the invention, the cylinder 50 can be formed from a plastic material. However, other materials are contemplated as being within the scope of the present invention.

I claim:

1. A dispenser for dispensing a selected volume of a granulated product comprising:
   a main body having a discharge opening and an open interior configured to receive a supply of the product;
   a loading and dispensing member having a receiving cavity formed therein, the receiving cavity including an open first end and defined by an inner cylindrical wall having a series of separate, spaced receiving grooves formed therein, wherein the series of receiving grooves define a plurality of distinct positions within the receiving cavity, wherein the open first end is aligned with the discharge opening of the main body to receive the granulated product; and
   a portion control member movably mounted within the receiving cavity, the portion control member including a top wall extending across the receiving cavity and a plurality of support feet each sized to be received in one of the receiving grooves to retain the portion control member in one of the plurality of distinct portions in the receiving cavity to define a portion volume within the receiving cavity.

2. The dispenser of claim 1 wherein the portion control member defines the portion volume between the portion control member and the open first end.

3. The dispenser of claim 1 wherein the portion control member is received within a lower section integrally formed with the main body, the lower section including a discharge spout.

4. The dispenser of claim 3 wherein the loading and dispensing member is movable between a loading position in which the open first end is aligned with the discharge opening and a dispensing position in which the open first end is generally aligned with the discharge spout.

5. The dispenser of claim 4 further comprising a handle connected to the loading and dispensing member and operable to move the loading and dispensing member between the loading position and a dispensing position.

6. The dispenser of claim 1 further comprising a series of volume markings contained on the loading and dispensing member and each aligned with one of the receiving grooves to display the portion volume when the portion control member is received in the receiving groove aligned with the volume marking.

7. The dispenser of claim 1 wherein the loading and dispensing member is movable between a loading position wherein the open first end is aligned with the discharge opening of the main body and a discharge position wherein the open first end is positioned to discharge the granulated product from the main body.

8. A dispenser for dispensing a selected volume of a granulated product comprising:
   a main body having an open interior configured to receive a supply of the product, the main body having an open loading end and a discharge opening;
   a loading and dispensing member movable between a loading position and a dispensing position, the loading and dispensing member including a receiving cavity extending from a first end to a second end defined by a cylindrical inner wall having a series of separate, spaced receiving grooves formed therein, wherein the series of receiving grooves define a plurality of distinct positions within the receiving cavity; and
   a portion control member movably mounted in one of the plurality of distinct positions within the receiving cavity between the first end and the second end to define a portion volume between the portion control member and the open first end, wherein the portion control member includes a top wall extending across the receiving cavity and a plurality of support feet each sized to be received in one of the receiving grooves to retain the portion control member in one of the plurality of distinct positions in the receiving cavity to vary the portion volume.

9. The dispenser of claim 8 wherein the open first end of the receiving cavity is aligned with the discharge opening of the main body to receive the portion volume of the product when the loading and discharge member is in the loading position.

10. The dispenser of claim 9 wherein the open first end of the receiving cavity is aligned with a discharge spout to dispense a product when the loading and dispensing member is in the dispensing position.

11. The dispenser of claim 8 further comprising a series of volume markings contained on the loading and dispensing member and each aligned with one of the receiving grooves to display the portion volume of the portion cavity when the portion control member is received in the receiving groove aligned with the volume marking.

12. The dispenser of claim 8 wherein the loading and dispensing member is generally cylindrical.

13. The dispenser of claim 8 further comprising a handle connected to the loading and dispensing member and operable to move the loading and dispensing member between the loading position and the dispensing position.

14. The dispenser of claim 8 further comprising:
a pair of attachment flanges extending from the main body; and
a mounting bracket configured to receive the attachment flanges, wherein the mounting bracket is configured to be mounted to a vertical support surface.

* * * * *